US005747750A

United States Patent [19]
Bailey et al.

[11] Patent Number: 5,747,750
[45] Date of Patent: May 5, 1998

[54] SINGLE WELL SYSTEM FOR MAPPING SOURCES OF ACOUSTIC ENERGY

[75] Inventors: Jeffrey R. Bailey, Houston; Marion M. Ringo, League City, both of Tex.

[73] Assignee: Exxon Production Research Company, Houston, Tex.

[21] Appl. No.: 298,610

[22] Filed: Aug. 31, 1994

[51] Int. Cl.$^6$ ..................... G01V 1/00
[52] U.S. Cl. ............... 181/112; 181/122; 340/854.9; 340/855.2; 73/152.16; 73/152.17; 175/50
[58] Field of Search ............ 340/854.9, 855.2, 340/855.9; 181/122, 112; 73/152.16, 152.17; 175/40, 50

[56] References Cited

U.S. PATENT DOCUMENTS

| | | | |
|---|---|---|---|
| 4,428,422 | 1/1984 | Laurent | 166/212 |
| 4,686,653 | 8/1987 | Staron et al. | 367/25 |
| 4,888,740 | 12/1989 | Brie et al. | 367/30 |
| 4,891,641 | 1/1990 | Gard et al. | 340/854.9 |
| 4,910,718 | 3/1990 | Horn | 367/124 |
| 4,992,994 | 2/1991 | Rambow et al. | 367/25 |
| 5,010,527 | 4/1991 | Mahrer | 367/86 |
| 5,189,262 | 2/1993 | Engler et al. | 181/102 |
| 5,212,354 | 5/1993 | Miller et al. | 181/108 |
| 5,290,159 | 3/1994 | Miller et al. | 417/521 |
| 5,594,706 | 1/1997 | Shenoy et al. | 367/76 |

FOREIGN PATENT DOCUMENTS

2 230 091   10/1990   United Kingdom .

OTHER PUBLICATIONS

Dobecki, T.L., "Hydraulic Fracture Orientation Using Passive Borehole Seismics," Society of Petroleum Engineers, No. 12110, 1983.

Ilderton, David C. et al., "Microseismic Imaging of Hydrofractures with the Aid of Conical Wgaves, " 63rd SEG Meeting, pp. 267–270, 1993.

Lacy, L.L., "Comparison of Hydraulic–Fracture Orientation Techniques," Society of Petroleum Engineers, pp. 322–332, 1984.

Sleefe, G. E., et al., "Observations of Broad–Band Micro–Seisms During Resevoir Stimulation,", 63rd SEG Meeting, Washington, 1993.

Sleefe, G.E., et al., "Experimental Study of an Advanced Three–Component Borehole Seismic Receiver," 1991, 61st SEG Meeting, Houston, Texas, 1991.

Stewart, L., et al., "Acoustic–Emission Monitoring During Hydraulic Fracturing," Society of Petroleum Engineers Formation Evaluation, pp. 139–144, 1992.

Schlumberger *Oilfield Review*, pp. 10–14, Jan. 1994.
DialIndex search Jan. 20, 1994.
Derwent World Patent Index Jan. 21, 1994.
Dialog search Jan. 24, 1994.
Dialog search May 5, 1994.
Derwent search May 5, 1994.
Derwent search May 6, 1994.

*Primary Examiner*—J. Woodrow Eldred

[57] ABSTRACT

Apparatus and method for determining the location of the source of seismic energy around a well are provided. Multiple seismic receivers, each receiver having orthogonal seismic sensors, are axially spaced on a tool which is capable of sending real-time seismic signals to the surface over conventional wireline. A method for calculating the location with respect to the receivers is also provided, the method employing data from all the sensors and a performance function to minimize error in the determination of location, and a simplified method is provided for determining if a fracture has extended past a selected depth in a formation.

17 Claims, 6 Drawing Sheets

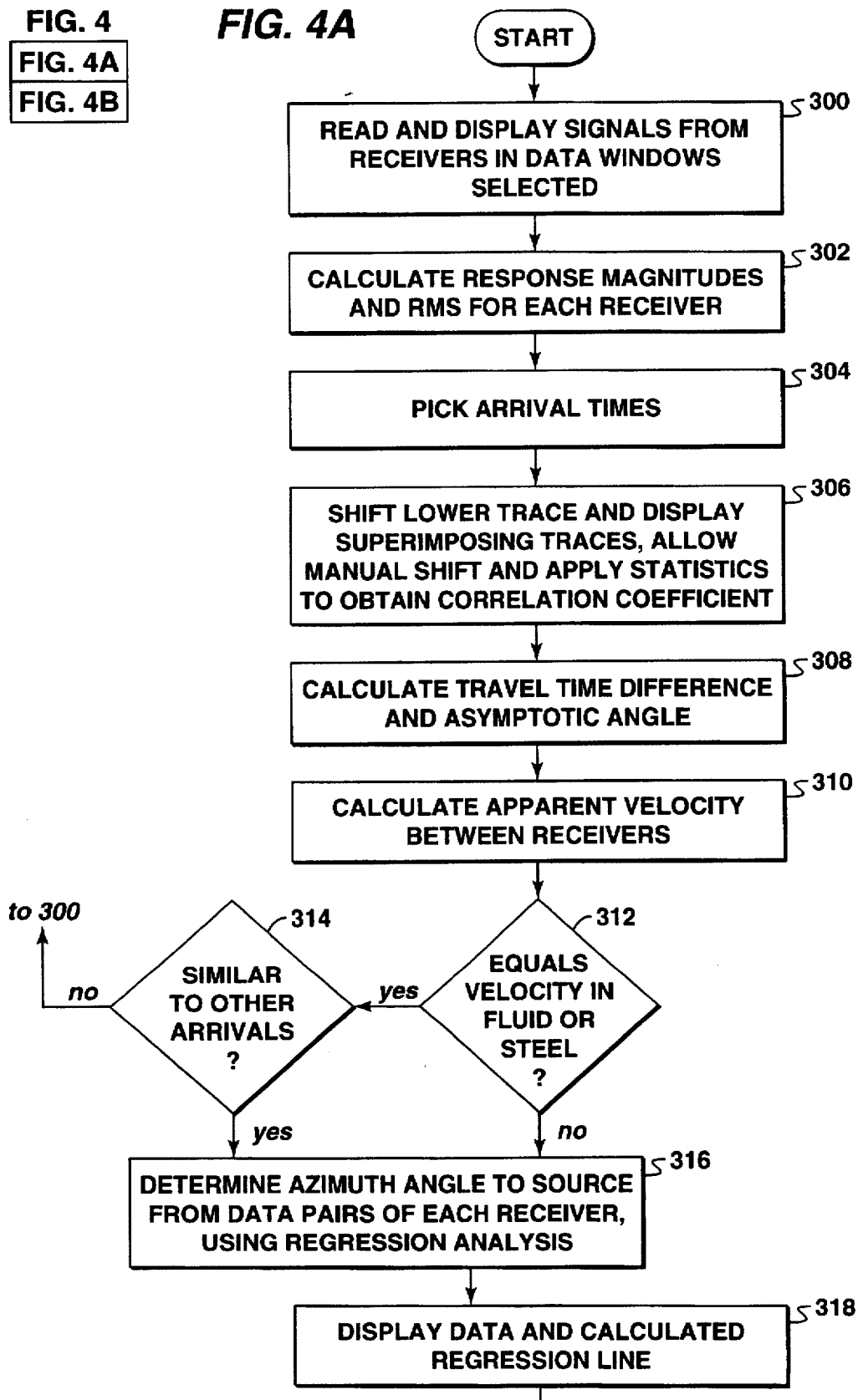

SINGLE WELL SYSTEM FOR MAPPING SOURCES OF ACOUSTIC ENERGY

BACKGROUND OF THE INVENTION

1. Field of the Invention

This invention relates to geophysical apparatus and methods. More particularly, a system is provided for locating the sources of microseismic events or other acoustic waves around a well.

2. Description of Related Art

Low-energy acoustic waves are created in solids when stresses in the solid cause sudden movement of fractures or zones of weakness. The energy release may be referred to as "acoustic emission" or, more commonly when the solid is a formation in the earth, the energy release is called a "microseismic event." Microseismic events may be caused by fluid pressure changes in the pore spaces of rock, which cause stress changes in the rock and movement at planes of weakness, or by the formation of hydraulic fractures. The seismic wave generated can be considered to be an extremely weak earthquake. It has been known for many years that such microseismic events occur in hydrocarbon reservoirs in which substantial pressure changes occur.

Hydraulic fracturing of wells is widely practiced as a means for increasing the production rate of the wells. In this method, fluid is injected at a high rate and at a pressure greater than the earth stress in the formation to be fractured. Typically, a vertical hydraulic fracture is created around a well, and the fracture may extend several hundred feet from the well. The fracture may also extend significant distances along the wellbore.

It is important to know the extent of a hydraulic fracture along a wellbore, so that it can be determined if the fracture has grown to intersect other permeable zones above or below the zone of interest. It is also desirable to know the length of the fracture away from the wellbore and the direction or azimuth angle of the fracture extending away from the well, so that the influence of the fracture on flow of fluids in the zone of interest can be predicted with greater accuracy.

It is also important to know whether a hydraulic fracture has penetrated an impermeable barrier layer during injection of a fluid into a well for disposal purposes. Such fluid may be a brine, radioactive material or a hazardous chemical waste stream, for example. It is desirable to have a tool which can detect possible movement of the fluid and any solids it may contain out of the intended injection zone. Detection of microseismic events originating beyond an impermeable barrier which bounds the intended injection zone can indicate such movement.

Not surprisingly, a large number of microseismic events are associated with the hydraulic fracturing process. Several years ago it was found that an indication of hydraulic fracture direction or azimuth angle can be derived from microseismic events occurring soon after the hydraulic fracture is formed. Early work was reported by Dobecki in "Hydraulic Fracture Orientation Using Passive Borehole Seismics," Soc. of Pet. Engrs. Paper No. 12110, 1983. Data from microseismic events were analyzed to determine the polarization of the pressure- or p-wave from each event to determine azimuth direction of the event, the polarization being determined from a "hodogram." A hodogram is a plot of the output of a geophone in one direction versus the output of a geophone in another direction, such as the x-direction versus the y-direction. The distance from the event to the well was calculated by measuring the difference in arrival-time of the pressure- or p-wave and the shear- or s-wave at the well and multiplying this difference by a factor involving the respective p- and s-wave velocities. A histogram of the seismic events following hydraulic fracturing was also plotted in polar coordinates to indicate the azimuthal distribution of events and consequently, the direction of the hydraulic fracture.

Much more recently, examination of seismic events received in a well during hydraulic fracturing, pressure fall-off after fracturing and flow-back of fluid was reported in "Acoustic Emission Monitoring During Hydraulic Fracturing," SPE Formation Evaluation Journal, pp. 139–144, June 1992. It was pointed out in this paper that when detecting microseismic events with a single set of triaxial geophones, an ambiguity of 180° exists in the vertical or z-direction. The polarity of the first motion on arrival of a wave is not known because a source above or below the receiver may produce an identical signal.

A method of locating fractures from acoustic emissions received by single geophones placed in wells at a known distance from the well being fractured was reported in "Observations of Broad Band Microseisms During Reservoir Stimulation," Society of Exploration Geophysics 63rd Conference, Washington, 1993. This method is relatively expensive in that multiple wellbores must be used and multiple tools must be run. Triangulation calculations are used to locate the source of seismic events using the signals received in the separate wells.

Microseismic events may be produced in the subsurface by processes other than hydraulic fracturing of wells or pressure changes in a reservoir. Subsidence accompanying reservoir pressure reduction may also lead to movement of piles or other equipment at the surface or seabed above a reservoir, for example, producing additional microseismic events. Also, increase of pressure inside the casing of a well may cause mechanical failure of the cement sheath around the casing, and an acoustic wave may originate from very near the casing. If there is communication of fluid pressure along the wellbore outside the casing, because of lack of a hydraulic seal by the cement, the pressure changes may cause microseismic events originating very near the casing.

Sources of acoustic waves in the subsurface are not limited to microseismic events. For example, a well flowing uncontrolled to the surface of the earth, called a "blowout", may flow at such high rates that significant acoustic noise is created at the bottom or at other segments of the well. There is often a need to locate the source of this noise in order to assist in attempts to stop the uncontrolled flow. Measurements of the source of the noise may be made from offset wells.

Wellbore receivers for seismic waves have become widely available in recent years for Vertical Seismic Profiling (VSP) in wells. They include means for clamping three orthogonal seismic transducers (geophones or accelerometers) against the casing of a well. In recent years, receivers suitable for seismic waves up to frequencies of 1000 Hz have been developed for cross-well seismic imaging. Such receivers, described in U.S. Pat. No. 5,212,354, may be used simultaneously at several levels, at intervals of about 10 feet between each receiver, to record seismic signals generated in another well. These seismic receivers use hydraulic pressure to clamp the receivers against casing with a high force compared with the weight of the receiver. A plurality of receivers may be used in a well, flexibly connected by hydraulic hose to other receivers and to the source of hydraulic pressure. The seismic signals are typically digitized and transmitted to the surface of the earth over conventional electric wireline. Digitization of the downhole signals commences upon trigger activation of the "shot break" and continues for about one second as data is stored in downhole memory. Subsequently, the data is pulsed to surface over a digital channel while the tool is inactive.

There is a need for improved apparatus and method to be used in a well to detect microseismic signals or other acoustic waves arriving at that well in real-time, with no periods of inactivity. The apparatus and method should decrease the ambiguity present in prior measurements; specifically, the 180° ambiguity present when only one set of triaxial transducers is used in a well. Also, the apparatus and method should allow determination of the distance to an event without the necessity of using both the p-wave and s-wave signals and their respective wave velocities. To make possible real-time acquisition of data from multiple receiver units having triaxial geophone sensors or transducers, improved apparatus and method for communicating additional channels of data to the surface are needed. The apparatus and method should use conventional multi-conductor wireline. Also, to assist in interpreting real-time microseismic activity around a well, means for communicating to the surface other downhole data such as pressure, temperature and hydrophone signals in the wellbore should be available, along with the seismic data. Therefore, there is a need for means of telemetry of at least 6 and preferably 9 or more channels of data to the surface as acoustic waves around a well are generated and received. There is also a need for an improved method to process and allow interpretation of the data from the multiple receivers to provide greater accuracy in locating the sources of the acoustic waves. In addition, there is a need to determine whether a microseismic event originated above or below a specific location in a well. This information can be used, for example, to determine if a hydraulic fracture has formed from injection of fluid into a well and the fracture has penetrated an impermeable barrier confining the injection zone.

SUMMARY OF THE INVENTION

In one embodiment, apparatus including a plurality of rigidly connected seismic receivers on a single tool is provided. The receivers on the tool are axially spaced apart a distance so as to facilitate location of event sources in a vertical plane and are clamped in a well. Signals from the receivers are transmitted to the surface over wireline in real-time using frequency modulated telemetry signals. The multiple individual signals are recovered at the surface by bandpass filtering and converted to amplitude modulated signals.

In one embodiment, a downhole electronic circuit to compress the data using a dynamic range compression algorithm is included. In another embodiment, the electronic module may contain a gyroscopic method or inclinometer method for orientation measurements, pressure and temperature sensors, casing collar locator, and one or more hydrophones, along with the power supply and associated circuitry.

A method of locating acoustic wave sources employing data from multiple receivers is provided. The method includes calculating a surface in space of all possible points with a measured delay time between events. The azimuth angle from each triad of sensors is attained by a regression analysis of the early part of each event arrival, using techniques similar to a hodogram analysis. The azimuth angles then limit the surface of points to a locus of points in the plane passing through the wellbore at this azimuth angle. The inclination angles from each receiver, determined by the relative strengths of the vertical and horizontal geophone responses, are then determined. These angles may then be used to estimate the point of origin of the acoustic event along the arrival time difference locus of points. If the tool contains more than two sensor sets, the intersection of the locus of points found by arrival time difference from multiple pairings of the receivers are also used to yield an estimate of the point of origin. Calculations which yield multiple estimates of the same result are treated in a least squares approach to improve the accuracy of the result with additional measurements.

In yet another embodiment, apparatus of this invention is placed in a well and signals from two receivers are observed to determine if a hydraulic fracture has penetrated a selected depth in a formation around the well.

DETAILED DESCRIPTION OF THE DRAWINGS

Figure 4B:
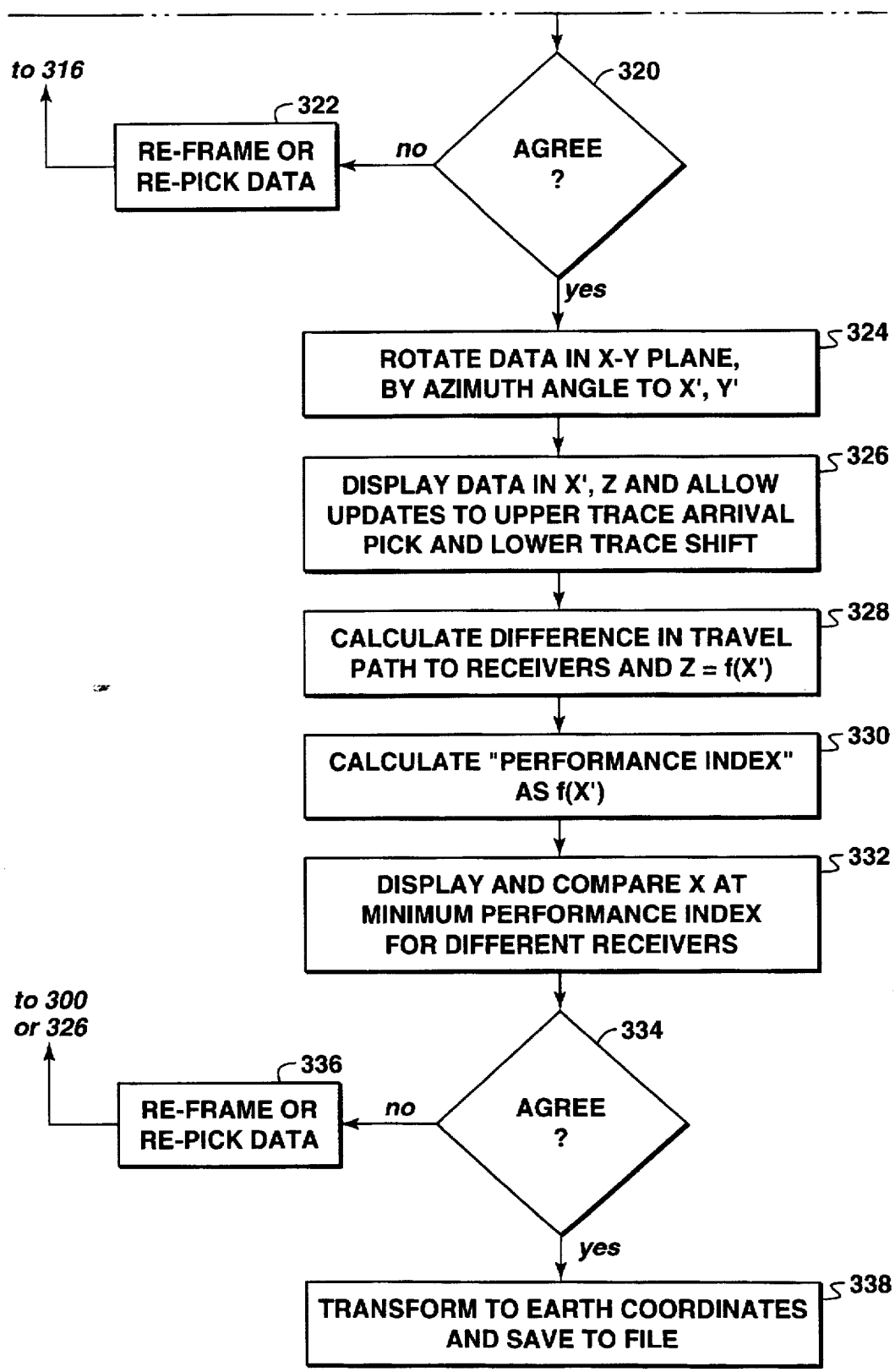

FIGS. 4(a) and 4(b) is a flow chart of the method of this invention for calculating the location of acoustic energy around a well.

Figure 5:
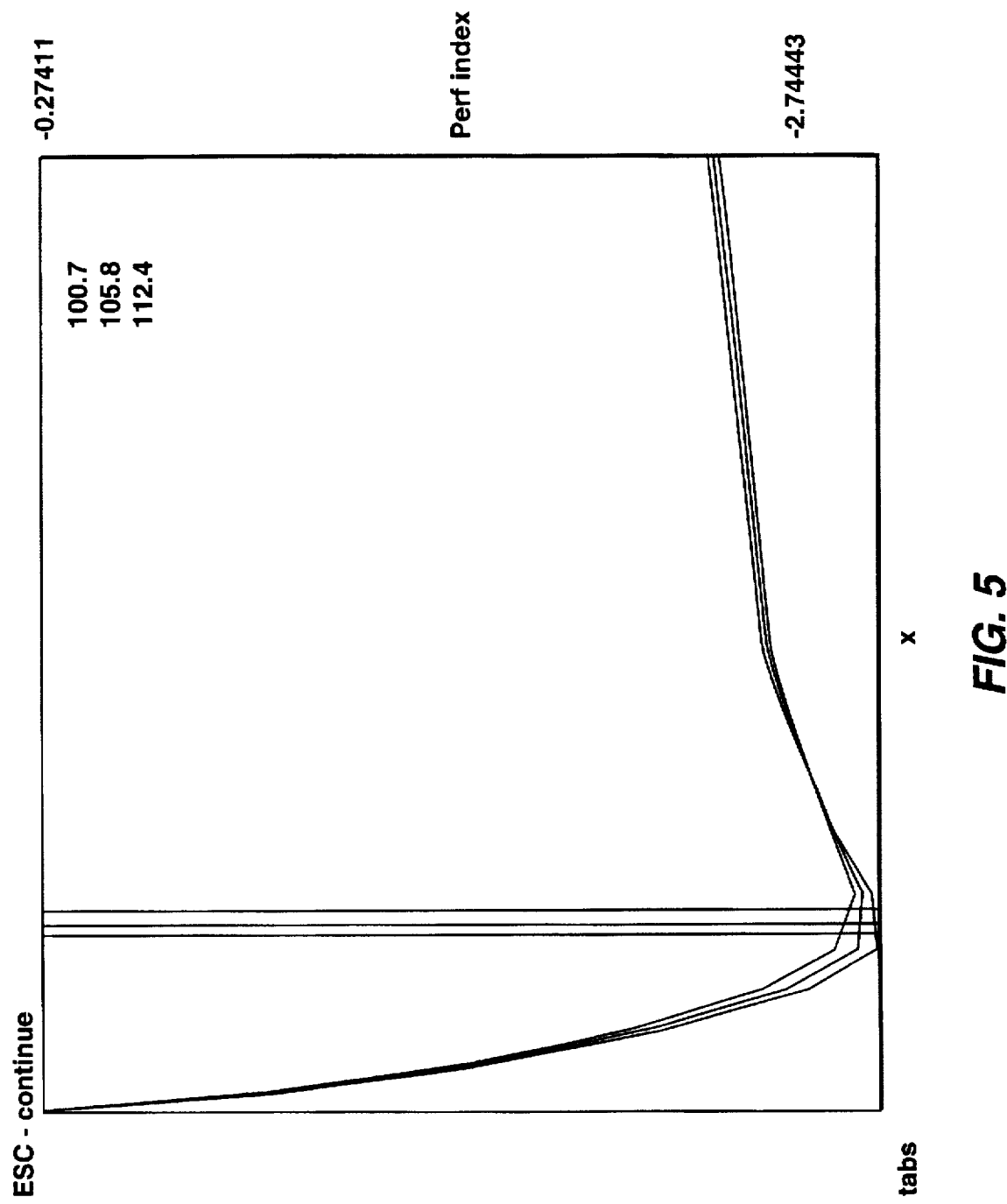

FIG. 5 is a graph of a Performance Index used to determine the most likely distance x to a source of acoustic energy.

DETAILED DESCRIPTION OF THE INVENTION

Figure 1:
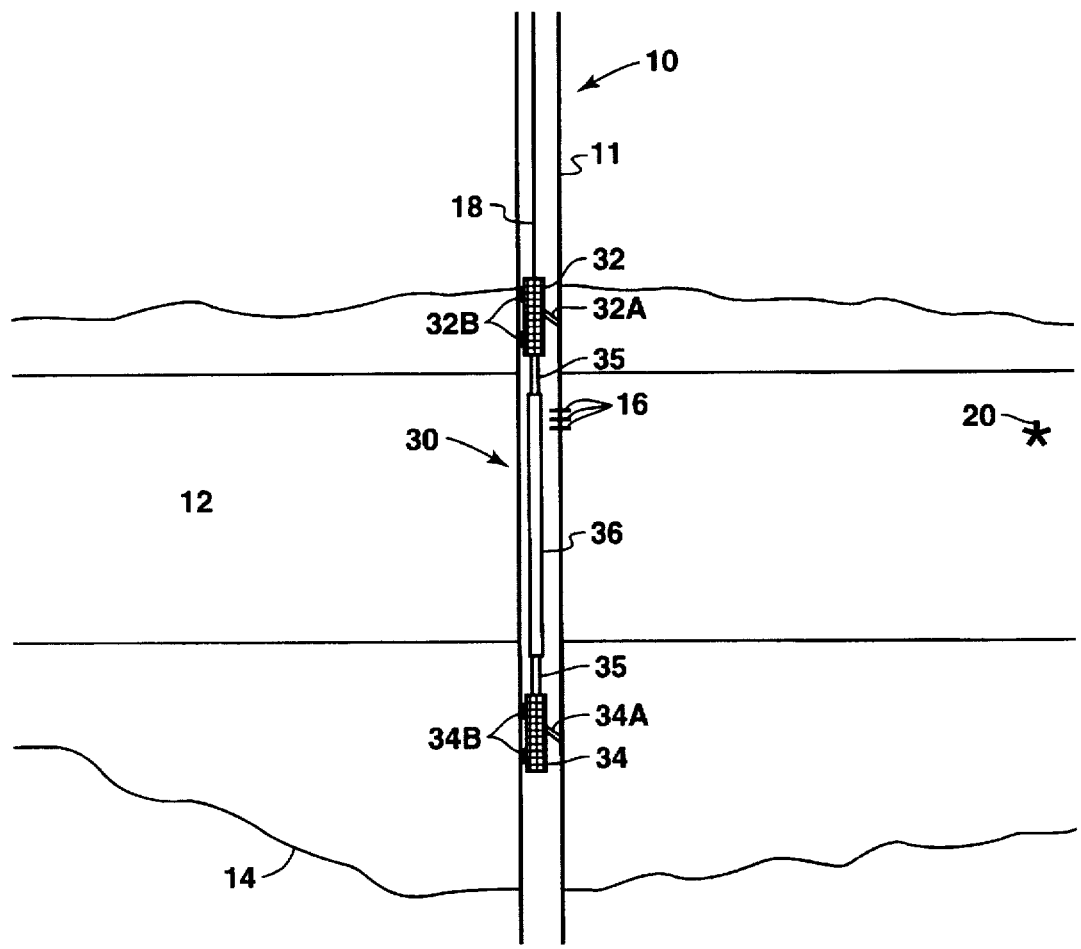
FIG. 1 is a sketch of a well having a hydraulic fracture extending therefrom and the apparatus of this invention suspended therein.

Referring to FIG. 1, well 10, penetrating formation 12, contains casing 11 and has been hydraulically fractured to form vertical fracture 14 in and extending from formation 12. Microseismic event 20 has occurred along the plane of hydraulic fracture 14.

Apparatus 30 of this invention has been placed at some point in casing 11 having perforations 16 using wireline 18. Wellbore 10 may be in any selected direction, although the description provided herein will refer to a vertical wellbore. Apparatus 30 comprises receiver units 32 and 34 and electronic module 36. Electronic module 36 may also contain a pressure and a temperature sensor, a hydrophone, a gyroscopic directional indicator or inclinometer and other types of instruments. Receiver units 32 and 34 are clamped to casing 11 by clamps 32A and 34A, respectively, with sufficient force to insure that they follow the movement of the casing at least up to the highest frequencies of the seismic energy to be detected. Standoff feet 32B and 34B may be used to increase effectiveness of the clamping force.

Receivers 32 and 34 preferably contain triaxial geophones or accelerometers, i.e., three orthogonal geophones or accelerometers, although for some applications it will not be necessary that sensors be used for all three directions. Preferably, the clamping force exerted by clamps 32A or 34A is at least equal to one-half the total weight of the tool, but may be several times as great. Clamps 32A and 34A may be actuated by any source of force, but preferably are actuated by an electric motor, which may be controlled from the surface using well-known techniques. Additional receivers, similar to 32 and 34, may be added to the apparatus, each receiver spaced apart from other receivers.

The distance between receiver units 32 and 34 is selected to be sufficient to allow a measurable difference in the time of arrival of acoustic waves from microseismic events which originate at significant distances from the well. The receivers are preferably at least 10 feet apart, which would be adequate to measure differences in arrival times of p-waves originating from a microseismic event occurring remote from the well and significantly above or below the plane perpendicular to the tool, but more preferably the receivers are at least 30 feet apart. The receivers are preferably placed at opposite ends of the tool. Sinker bars to increase the weight of the tool for running into wells under pressure may be added to the tool. The presence of two receivers on the tool makes possible determination of whether a microseismic event has occurred above or below the tool, and will thus resolve the 180° ambiguity present in the prior art tools, since the acoustic energy from the event will arrive first at the receiver nearest the event.

The maximum distance between receivers or the length of the tool will usually be limited by the length of the lubricator available if the apparatus is used in a well which will have pressure at the surface when the tool is run in or removed from the well. A lubricator is a device attached to the wellhead of a well for sealing around the wireline used to support a tool in a well. The maximum length of a standard lubricator is about 90 feet.

Couplings 35 between receivers 32 and 34 and electronic module 36 are preferably flexible to allow bending while receivers are in the clamped position but are sufficiently rigid to prevent significant torsional deformation. It is important that the angle between the receivers along the axis of the tool be constant while the tool is in a well, such that the azimuth angle of each receiver be determinable with respect to the other receiver and to a means of orienting the tool in a well, such as a gyroscope. To minimize transmission of acoustic energy between receivers, couplings 35 are preferably smaller in diameter than electronic module 36 or receivers 32 and 34. To minimize weight and provide suitable mechanical properties of couplings 35, couplings 35 are preferably tubes, which are preferably made of titanium, but may be made of any metal having suitable physical properties. A cable or hose comprised of strands interwoven so as to have high resistance to torsional deformation may also be used. The stiffness of coupling tubes 35 is preferably selected to allow bending of tool 30 in curved wellbores when the clamping force is applied by arms 32A and 32B. The bending allows receivers 32 and 34 to align with the wall of casing 11 and thereby to contact casing 11 over a greater area, which has the benefit of increasing signal strength from a source of acoustic energy outside the casing. The curvature of wells in intervals where the tool is to be run may be measured by techniques well-known in the art. This curvature, along with mechanical properties of the coupling tubes, is preferably used to calculate bending of couplings 35 when the clamping force is applied, to insure that receivers are aligned with the wall of the casing in a well by the clamping force.

As an example of the dimensions of the various components of a tool for use in wellbores, receivers 32 and 34 may be 2.6 inches in diameter, electronic module housing 36 may be 2.25 inches in diameter, and couplings 35 may be 1.6 inches in diameter. In addition to the components shown in FIG. 1, the tool may have a "bumper sub" attached at the bottom to minimize shocks to the tool when running in a well.

Figure 2:
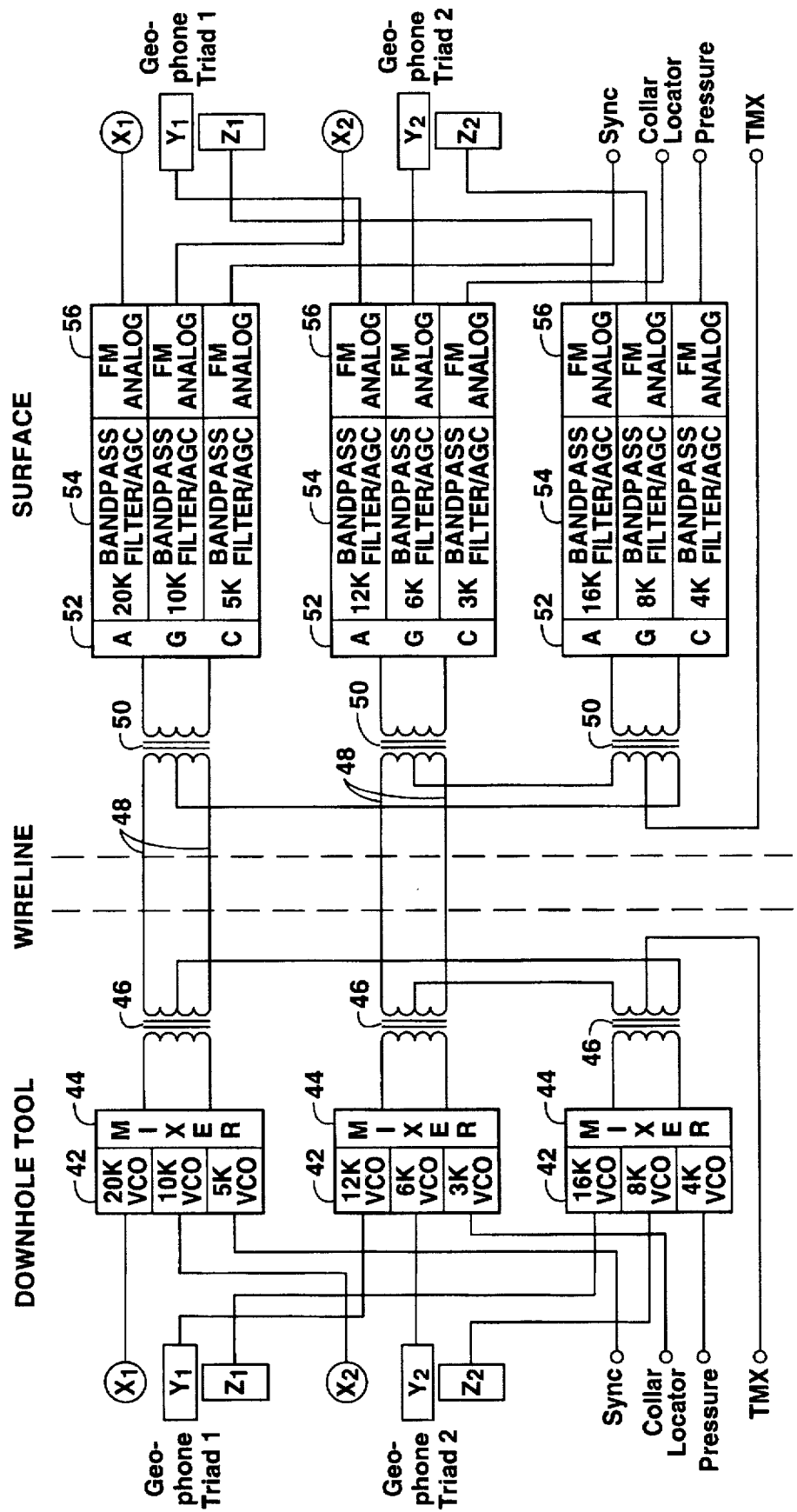
FIG. 2 is a schematic of electronic components of the apparatus of this invention.

Electronic module housing 36 includes the components of the "Downhole" segment of the circuit schematically illustrated in FIG. 2. Inputs to the circuit are the signals from the six geophones in the x, y and z directions in receiver units 32 and 34 and DC voltage signals from auxiliary instruments such as a pressure sensor, a temperature sensor, a collar locator, or a time synchronization pulse. Each of these signals is fed to a voltage controlled oscillator (VCO) 42 having a selected central frequency. These frequencies may be in the range from about 3 kHz to about 20 kHz. A proportional band oscillator or IRIG oscillator may be used in place of the VCO. The central frequency of each VCO receiving a signal from a geophone is selected to differ from the central frequency of other VCOs by a sufficient amount to allow for a bandwidth of frequencies adequate to transmit the geophone signals. Experiments observing microseismic events during hydraulic fracturing showed that the events could be adequately analyzed with frequencies below about 500 Hz. A bandwidth of about 5 per cent on each side of the center frequency was selected around the central frequency of each VCO receiving a geophone signal. The carrier frequencies and FM deviations are configured such that the intersection of a pass band with its nearest neighbor occurs at an amplitude at least 40 dB down from the amplitude at the peak frequency. The carrier frequencies are logarithmically equally spaced for optimal filtering and channel separation at the surface. It was found that the amount of "crosstalk" between signals being transmitted over wireline greatly increased at higher frequencies, and there was appreciable attenuation at frequencies above 20 kHz. Therefore, it was concluded that the highest carrier frequency should be in the range of about 20 kHz and that precise filtering of signals at the surface would be required to separate each individual channel. Frequencies indicated for each VCO on FIG. 2 were found to be a good compromise between minimizing crosstalk and attenuation of nine channels of signals transmitted over a 21,000 foot length of seven-conductor wireline while maintaining adequate signal resolution. Note that frequency separation at the lower frequencies can be reduced to only 1 kHz for use in transmitting auxiliary (not seismic) signals having lower bandwidth.

The VCO signal may consist of a slope-modulated triangle wave or of a sinusoidal or other suitable repetitive signal. In the downhole circuit shown in FIG. 2, signals from three VCOs are fed to a mixer circuit 44 for each group of central frequencies. In the mixer circuit, signals are passed through a low-pass filter to round the waveform and attenuate odd harmonics, each channel is gained by a calibrated value to boost high frequencies, and the signals are added. Output from each mixer is fed to the primary coil of transformers 46. It was found that to avoid severe attenuation at the higher frequencies it was necessary that transformer 46 be low impedance. This transformer was specifically built for data telemetry. It preferably has a ferrite core and is designed for operation at up to 100 kHz at a temperature of up to 200° C. A time-multiplexed signal is fed to the center tap of the secondary coil of transformer 46 receiving the intermediate frequency band, and the secondary of this transformer is fed to center taps of the other two transformers such that the outputs of all three transformers are fed to four conductors 48 of a wireline to transmit the signals to surface.

In an alternative embodiment of the electronics, the VCO outputs as shown in FIG. 2 are fed to a single mixer circuit, and the output of the mixer is fed to the primary coil of a single transformer. In this embodiment, the secondary of the transformer feeds only two conductors of a wireline. Other conductors in the wireline, if any, are then available for other signals.

Electronic module 36 may also include a dynamic range compression circuit for each geophone signal. This will make possible capturing more microseismic events which are larger and smaller than those otherwise captured. A square root analog signal may be produced to compress an input voltage range of −25 V to +25 V to the range of −5 V to +5 V, for example.

Wireline 18 of FIG. 1 exits well 10 and connects at the surface to a "surface" electronic unit (not shown). The electronic components of the surface electronic unit are shown in FIG. 2. The mixed frequency signals from wireline conductors 48 feed transformers 50, and the intermediate frequency transformer is center tapped by a time-multiplexed signal. The secondary of each transformer feeds Automatic Gain Control (AGC) circuit 52 for each group of frequencies. The signals are then filtered by bandpass filter/AGC 54. The filter is very important to the success of the FM telemetry system. Preferably, a system of filters is used to produce a reduction in signal strength of at least 40 db at the intersection of neighboring bandwidths. Digital bandpass filters, such as the SGS Thomson TGS 8550 or 8551, are suitable for this purpose. Alternatively, analog filters may be used. The output of the filter then feeds circuit 56, which includes a frequency-to-voltage converter, consisting of a high-speed comparator sampling circuit to determine the period of each wave. The time interval digital count is converted to an analog signal via a digital-to-analog converter. The analog signals from each geophone and other instruments may then be displayed and recorded.

Figure 3:
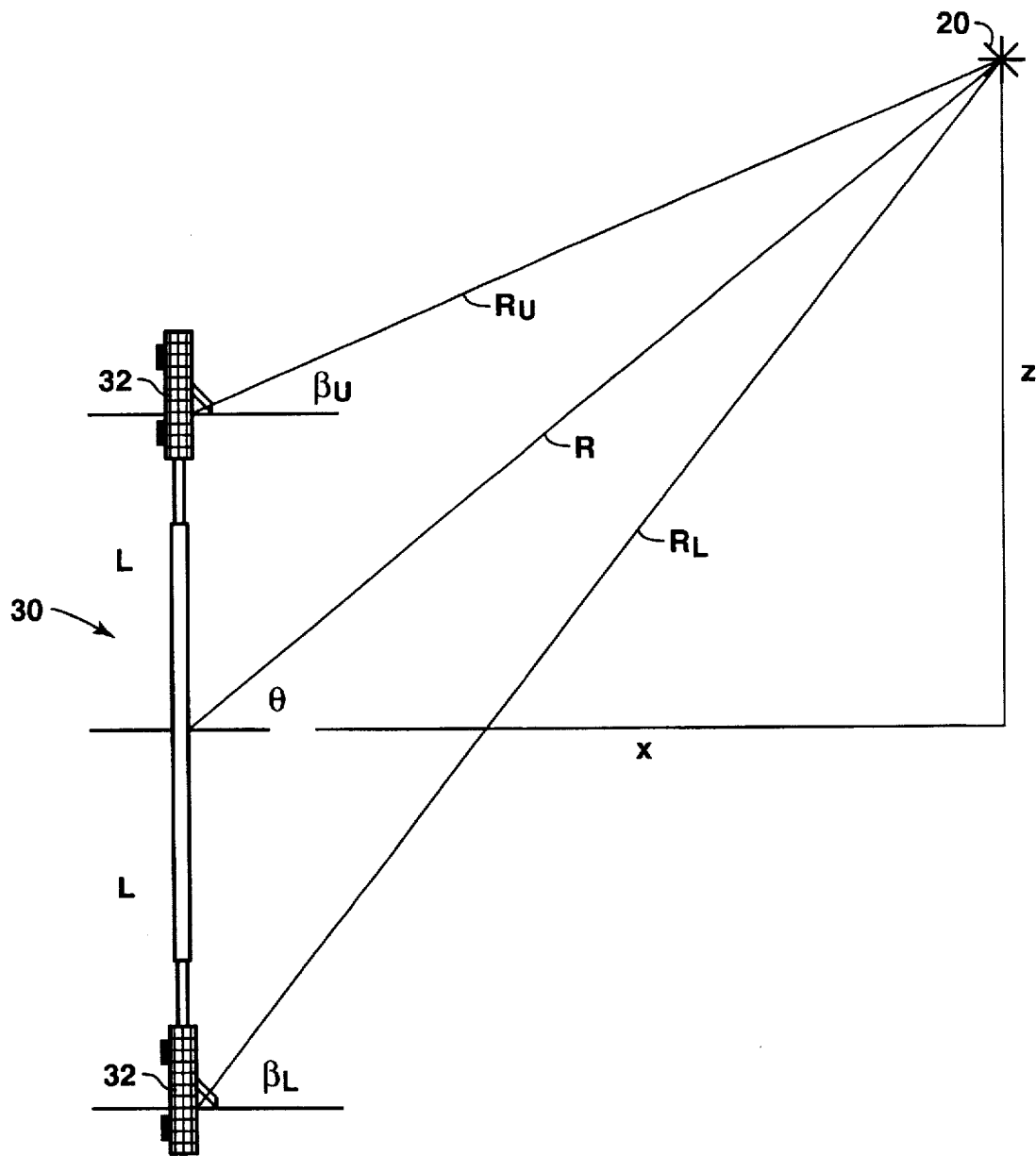
FIG. 3 is a sketch describing the variables used to define the location of a source of acoustic energy with respect to the apparatus of this invention.

In one embodiment of the method for analyzing signals from an instrument system having two receivers in a well to determine the location of the source of a microseismic event, calculations based on first arrival time difference, triangulation, and statistical methods are applied to signals from two receivers. FIG. 3 shows the geometric parameters used in the calculations. Receivers 32 and 34 are spaced a distance 2L apart. Microseismic event 20 occurs at a distance z above the line perpendicular to tool 30, a distance x perpendicular to tool 30, and at distances $R_U$ and $R_L$ from receivers 32 and 34, respectively.

Referring to FIG. 4(a) and FIG. 4(b), a flow chart for the program which may be executed by a computer to implement a preferred embodiment of the invention is shown. The program begins at step 300, where the x, y, and z geophone response signals from two receivers are read and displayed in a "data window" on a computer monitor. For example, about 100 time samples of the amplitudes of a microseismic event, the samples about 0.1 millisecond apart, may be used. The data window is a selected subset of the full record of the signals, and can be selected and modified by an interpreter using the program. Control proceeds to step 302 where the magnitudes of the signals and the RMS for each receiver component are calculated. Magnitude is calculated by the usual formula:

$$m = \sqrt{x^2 + y^2 + z^2} \tag{1}$$

Control then proceeds to step 304 where arrival times at each receiver are automatically picked by the program, the pick being determined by the first significant magnitude peak above the RMS level. Control then proceeds to step 306 where traces of the x, y, z, and m data are displayed on a monitor, with a time line to show the selected arrival pick. Data from upper and lower receivers are displayed superimposed, with the lower receiver data shifted in time so as to align the initial break times.

The pick of first arrival and shift times may be manually adjusted as required by the interpreter. For time shifts that are integral multiples of the digitization interval, a shifted data set is obtained by copying the data with an offset index. Time shifts that contain fractional multiples of the digitization interval require an index offset plus an interpolation between data samples for the fractional part. The selection of an appropriate time shift is accomplished by visual examination of the data and the use of zero-shift cross-correlation statistics, which are calculated by the program using well-known techniques.

At the position of maximum correlation, control proceeds to step 308, where the travel time difference between the signals arriving at the two receivers, $\Delta t$, is calculated. Using this value, the asymptotic angle, $\Theta_\infty$, to a source located at infinity may be found using the equation:

$$\Theta_\infty = \arcsin\left(\frac{V_P \Delta t}{2L}\right) \tag{2}$$

for a tool of length 2L between receivers. This value will be used in subsequent calculations as a check to insure that the values of calculated angles are within bounds.

Control then proceeds to step 310, where the apparent velocity between the receivers is calculated using the equation:

$$V_{app} = \frac{2L}{\Delta t} \tag{3}$$

Control then proceeds to step 312 and the apparent velocity is compared with the velocity of acoustic waves travelling in fluid or steel, which are about 5,000 and 17,000 ft/sec, respectively. If the velocities are not similar, control transfers to step 316. If similar velocities are detected, control transfers to step 314, where the interpreter decides whether or not the event is suitable data for further processing by comparing the events to similar arrivals.

The interpreter may also relocate the beginning of a wave form or reset the parameters of the current data window. This may be desirable, for example, because some points of a hodogram depart from what is considered a reasonable form of the figure. If the answer is then yes, control proceeds to step 316. If the answer is no, the data are discarded and control proceeds to step 300 for processing of additional data.

At step 316, the azimuth angle to the source is determined by linear regression of the x-y data pairs in the current data window. That is, the value of x and y at each time is read and the minimum deviation from measured points and a straight line is determined. In this calculation, the data is assumed to have the same slope at both receivers to provide a single estimate of the azimuth. However, the intercept is allowed to be different at the two receivers, since this value can be affected by the individual background signals at each receiver. The regression may also be weighted in time, such that, for example, earlier-in-time points in an arriving wave are weighted more heavily in calculating the best fit to the data points.

Control proceeds to step 318 where the x-y data at each receiver are plotted in the form of a hodogram and the regression lines are indicated. In step 320 the interpreter determines whether or not the regression lines provide satisfactory agreement with the data; if not, control proceeds to step 322, where the data is re-framed or re-picked and control is transferred back to step 316. For example, the data may agree with the regression lines for a part of the time samples and then depart. In that case, an interpreter may elect to re-frame, i.e., select a different data window, or re-pick the arrival times.

If agreement is satisfactory in step 320, control proceeds to step 324, where a coordinate rotation is applied to the data. A rotation in the x-y plane by the azimuth angle is performed to align the new x-axis towards the source. Both the wellbore and the event source then lie in the new x-z plane. In matrix form, the rotation is written as follows:

$$\begin{pmatrix} x' \\ y' \\ z' \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} x \\ y \\ z \end{pmatrix} \quad (4)$$

Control is transferred to step 326, and the transformed data is displayed. The trace pick and shift times may be updated by the interpreter in this step. Control is then transferred to step 328, where the difference in travel path lengths from source to each receiver is calculated, based on the time shift and the formation sonic velocity, $V_p$. The path length difference is computed as follows:

$$\Delta R = V_p \Delta t \quad (5)$$

The event source must lie on a locus of points in the x-z plane with this measured path length difference. This locus of points is specified by the following relation:

$$\Delta R = R_L - R_U = \sqrt{x^2 + (z+L)^2} - \sqrt{x^2 + (z-L)^2} \quad (6)$$

Control is then transferred to step 330. At step 330, a quadratic "Performance Index" used to determine the distance x to an event is formulated. For a given $\Delta R$ and x, the value of z is specified by the above relation. The slopes of lines from a trial source location to each receiver are given by the following relations:

$$\alpha_U = \frac{z-L}{x} \text{ and } \alpha_L = \frac{z+L}{x} \quad (7)$$

These lines are compared with the x-z microseismic response data to determine, as a function of x and z, how well the data fit these slopes. The quadratic Performance Index to quantify the degree of fit may be written as follows:

$$e(x) = e_U(x) + e_L(x) \quad (8)$$

for $$e_U(x) = \sum_{i=1}^{n} \{z_{Ui} - (\alpha_U x_{Ui} + \gamma_U)\}^2 \quad (9)$$

$$e_L(x) = \sum_{i=1}^{n} \{z_{Li} - (\alpha_L x_{Li} + \gamma_L)\}^2$$

and where:

$$\gamma_U = \frac{1}{n} \left\{ \sum_{i=1}^{n} z_{Ui} - \alpha_U \sum_{i=1}^{n} x_{Ui} \right\} \quad (10)$$

$$\gamma_L = \frac{1}{n} \left\{ \sum_{i=1}^{n} z_{Li} - \alpha_L \sum_{i=1}^{n} x_{Li} \right\}$$

Proceeding to step 332, calculations of $e(x)$, $e_U(x)$, and $e_L(x)$ as a function of x are displayed and the minimum values are obtained with a standard functional minimization routine. FIG. 5 shows an example of plots of $e(x)$, $e_U(x)$, and $e_L(x)$ as functions of x for a synthetic event with additive noise. The value of x at the minimum value is the most likely distance of the event from the receivers, in this example indicated by vertical lines 1,2 and 3, corresponding to values of x from 100.7 feet to 112.4 feet.

Control proceeds to step 334 where the interpreter determines if a satisfactory solution has been obtained. If the solution is not acceptable, the data window may be re-framed or different shift values may be inserted at step 336 and control transferred back to step 326. Alternatively, the event data may be rejected and control transferred back to obtain the next dataset at step 300.

If an acceptable solution has been obtained, control is transferred to step 338, where the resulting coordinates are transformed to the earth-based coordinate system from the tool system, based on gyroscopic or other directional data obtained from the tool, and results are written to a disk file for further display and analysis. Control then returns to step 300 to process the next data set.

The procedure for estimating the location of a microseismic event source has been described heretofore. The apparatus and method of this invention are also applicable to a continuous acoustic wave or a signal of acoustic noise from a source which is to be located. In such cases, a data window is selected, consisting of a selected number of time samples. The same procedure is then followed as set out above.

The apparatus and method of this invention may be extended to more than two receivers. In such case, the data from pairs of receivers may be treated as described above and average values taken for azimuth as in step 316 and x' in step 332, or statistical data may be processed for the receivers before azimuth and x' are calculated.

When the apparatus or method of this invention is applied to detection of the extent of a hydraulic fracture, the apparatus may be placed at a single location in a wellbore from which the fracture extends or it may be placed at multiple locations and microseismic events detected from each location. The apparatus may be placed in the well from which the fracture extends or it may be placed in an offset well.

If there is particular interest in determining if a hydraulic fracture has been extended out of the zone of fluid injection in an injection well, the apparatus may be placed at one or multiple locations near a possible barrier to fluid flow and arrival times of signals at two spaced apart sensors may be used to determine if microseismic events occur on the side of the barrier opposite the injection zone, using the techniques described above.

A less detailed method for determining whether a fracture has extended past a selected depth in the earth may also be used, in which it is not necessary to consider the azimuth angle of the fracture. In this method, the apparatus is placed in a well at a depth where the mid-point between two receivers is opposite the selected depth in the earth. The receivers are then clamped in place. If the apparatus is in a well offsetting the well from which the fracture extends, fluid may be injected as monitoring for microseismic events occurs. If the apparatus is in the same well from which the fracture extends, fluid will have been injected before monitoring for microseismic events begins. The arrival times of acoustic waves in the two receivers is then observed at the surface of the earth, using the amplitude modulated signals described above. If a signal arrives at the lower receiver before the upper receiver, it is then concluded that the event originated at a depth below the selected depth in the earth. Conversely, if the signal arrives at the upper receiver before the lower receiver, it is concluded that the event originated at a depth above the selected depth in the earth. Such conclusion would depend on uniform velocity in the interval between the receivers. If velocity differences in the interval are considered, the calculation of a modified depth can be readily considered using the velocities and geometrical factors illustrated in FIG. 3.

For example, it may be desirable to determine if a fracture penetrates an impermeable barrier which bounds an injection zone into which waste material is being injected. In the simplified method, to determine if a vertical fracture has been extended upward beyond a barrier above the injection zone, the apparatus having two receivers is placed with the mid-point between the receivers at the upper boundary of the barrier layer. The arrival times of microseismic events are then observed at the receivers. Sufficient time or number of events detected is allowed to obtain a sample of events. If the events detected all are detected at the lower receiver before the upper receiver, all microseismic events must originate from below the upper receiver. This method could be particularly important in instances of waste injection wells, where growth of a fracture upward could lead to contamination of shallower layers. These measurements can be made from the injection well after cessation of injection or from an offset well during or after injection.

Conversely, the method may be used to determine if a fracture has extended downward through a barrier layer. In this instance, the mid-point between the receivers would be placed at the bottom of the barrier layer and arrival times at the lower receiver first would indicate that the event occurred below the boundary layer and the fracture had penetrated the boundary layer. In either application, three sensors will normally be used in each receiver, but only one sensor, if the one is responsive in the z-direction may be used in each receiver, or two sensors, if both are responsive in the x-y plane, may be used in each receiver.

It has been observed that signals from microseismic events can be received through multiple strings of pipe in a well. For example, in a well having 5½-inch casing suspended in 13⅜ casing and extending only partially to the bottom, signal strength from explosion of a small test charge was only slightly attenuated when apparatus was clamped inside the 5½-inch casing rather than in the 13⅜ inch casing. Therefore, the apparatus of this invention may be placed inside multiple concentric pipes and the methods described above may be used to determine the source of microseismic events.

It will be appreciated that while the present invention has been primarily described with regard to the foregoing embodiments, it should be understood that variations and modifications may be made in the embodiments described herein without departing from the broad inventive concept disclosed above or claimed hereafter.

What is claimed is:

1. Apparatus for locating a source of acoustic waves in the earth, comprising:
    an elongated body having an axis and a plurality of segments and being adapted to be connected to a wireline to allow placing the apparatus in a well;
    a plurality of receivers comprising separate segments of the body, each receiver having a radius and including retractable means for exerting a force for clamping the receiver in the well and having three orthogonal seismic sensors, each sensor producing an electrical signal responsive to an acoustic wave impinging thereon; and
    electronic means including a plurality of voltage controlled oscillators, each oscillator having a selected mid-range frequency, the electronic means being disposed in a segment of the elongated body and being capable of converting the electrical signal from each seismic sensor to a frequency modulated signal.

2. The apparatus of claim 1 further comprising electronic means remote from the elongated body and adapted to be connected thereto by the electric wireline, the remote electronic means comprising electronic means for filtering the frequency modulated signals and converting the filtered frequency modulated signals to an amplitude modulated signal for each seismic sensor.

3. The apparatus of claim 1 wherein the distance between the receivers is greater than 10 feet.

4. The apparatus of claim 1 wherein the distance between the receivers is greater than 30 feet.

5. The apparatus of claim 1 wherein the apparatus comprises two receivers and the two receivers are located at opposite ends of the apparatus.

6. The apparatus of claim 1 wherein each receiver is clamped in the well with a force greater than one-half the weight of the apparatus.

7. The apparatus of claim 1 wherein the receivers are separated from a segment of the elongated body by couplings, the couplings being resistant to angular deformation around the axis of the apparatus.

8. The apparatus of claim 7 wherein the couplings are further selected to have sufficient flexibility along the axis to allow alignment of the receivers with the casing of the well in which the apparatus is to be placed when the receivers are clamped in the well.

9. The apparatus of claim 7 wherein the couplings are in the form of tubes having a radius less than the radius of the receivers and made primarily of titanium.

10. The apparatus of claim 1 wherein the mid-range frequencies of the voltage controlled oscillators are spaced apart in approximately equal logarithmic intervals in the frequency range from about 2 kHz to about 20 kHz.

11. The apparatus of claim 1 further comprising electronic means for compressing the dynamic range of a signal from a seismic sensor before it is converted to a frequency modulated signal.

12. The apparatus of claim 2 wherein the electronic means for filtering the frequency modulated signal comprises a digital bandpass filter.

13. The apparatus of claim 1 further comprising means for measuring the direction of the sensors of the apparatus while in the well.

14. A method for determining the location of a source of seismic energy in the earth, comprising:
    placing apparatus in a well on an electric wireline, the apparatus including (a) a plurality of seismic receivers, each receiver having three orthogonal seismic sensors and (b) electronic means for converting the signal from each seismic sensor to a frequency modulated electrical signal for transmission through the wireline, the electronic means including a plurality of voltage controlled oscillators, each oscillator having a selected mid-range frequency;
    activating means for clamping the receivers in the well;
    connecting the wireline at the surface to means for converting the frequency modulated signals received from the wireline to amplitude modulated signals; and
    using the amplitude modulated signals at the surface to calculate the location of the source from which the seismic signal originated.

15. The method of claim 14 wherein the source of seismic energy is a blowout of a well offset from the well in which the apparatus is placed.

16. The method of claim 14 wherein the source of seismic energy is a microseismic event associated with a hydraulic fracture around the well in which the apparatus is placed.

17. The method of claim 14 wherein the source of seismic energy is a microseismic event associated with a hydraulic fracture around a well offset to the well in which the apparatus is placed.

* * * * *